United States Patent
Djelassi

(10) Patent No.: US 12,265,361 B2
(45) Date of Patent: Apr. 1, 2025

(54) SYSTEM AND METHOD FOR REGULATING A PHYSICAL PARAMETER OF A REAL TURBOMACHINE SYSTEM FROM A PHYSICAL PARAMETER SET POINT

(71) Applicant: SAFRAN AIRCRAFT ENGINES, Paris (FR)

(72) Inventor: Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 590 days.

(21) Appl. No.: 17/605,355

(22) PCT Filed: May 4, 2020

(86) PCT No.: PCT/EP2020/062302
§ 371 (c)(1),
(2) Date: Oct. 21, 2021

(87) PCT Pub. No.: WO2020/239366
PCT Pub. Date: Dec. 3, 2020

(65) Prior Publication Data
US 2022/0228531 A1    Jul. 21, 2022

(30) Foreign Application Priority Data
May 29, 2019 (FR) ...................................... 1905707

(51) Int. Cl.
G05B 13/02 (2006.01)
(52) U.S. Cl.
CPC ........ G05B 13/024 (2013.01); *F05D 2270/44* (2013.01); *F05D 2270/71* (2013.01)
(58) Field of Classification Search
CPC ............ G05B 13/024; G05B 19/41875; G05B 2219/45031; G05B 11/01; F05D 2270/44; F05D 2270/71; H01L 22/12
See application file for complete search history.

(56) References Cited

U.S. PATENT DOCUMENTS

2017/0075326 A1 * 3/2017 Britt ..................... G05B 19/042

FOREIGN PATENT DOCUMENTS

| FR | 3040220 A1 | 2/2017 |
| JP | S62187903 A | 8/1987 |

(Continued)

OTHER PUBLICATIONS

Search Report from the French Intellectual Property Office on corresponding FR application (FR1905707) dated Mar. 13, 2020.

(Continued)

*Primary Examiner* — Thomas C Lee
*Assistant Examiner* — Tyler Dean Hedrick
(74) *Attorney, Agent, or Firm* — Alumen IP Law PC

(57) ABSTRACT

A system REG for regulating a physical parameter of a real turbomachine system F(p) from a physical setpoint parameter, the regulation system REG comprising a system OPTK for optimising the parameterisation gain K during the regulation, the optimisation system OPTK comprising a stability correction module determining a first gain component K1, a response time correction module determining a second gain component K2, the stability correction module being designed to inhibit the response time correction module when an instability is detected during the regulation of the physical parameter, and a determination module configured to determine the parameterisation gain K as a function of the previously determined first gain component K1 and second gain component K2.

11 Claims, 9 Drawing Sheets

(56) References Cited

FOREIGN PATENT DOCUMENTS

| JP | H09106303 A | | 4/1997 |
|---|---|---|---|
| WO | WO2009092409 | * | 7/2009 |

OTHER PUBLICATIONS

International Search Report and Written Opinion on corresponding PCT application (PCT/EP2020/062302) from International Searching Authority (EPO) dated Jul. 13, 2020.

* cited by examiner

SYSTEM AND METHOD FOR REGULATING A PHYSICAL PARAMETER OF A REAL TURBOMACHINE SYSTEM FROM A PHYSICAL PARAMETER SET POINT

TECHNICAL FIELD

The present invention relates to a system for regulating a physical parameter of a real system of a turbomachine from a physical parameter set point. For example, the physical parameter can correspond to a displacement speed of a turbojet valve, a fuel flow rate, an orientation angle of a vane, etc.

In a known manner, a regulation system REG comprises a corrector comprising a correction function C1(p) and a parameterization gain K. The performance of the regulation system is evaluated especially in terms of its response time and its stability. In practice, a regulation system is parameterized to ensure compromise between response time and stability.

In practice, a real system of a turbomachine comprises characteristics and variables that are likely to change and degrade over time (wear, drift, etc.). Therefore, a regulation system the operation of which is optimal when commissioned may be non-optimal a few months later, in particular, in terms of stability. To eliminate this potential drawback, during commissioning, the regulation system is parameterized to have a large stability margin, which affects the response time.

The present invention aims at eliminating at least some of these drawbacks by providing a regulation system that can dynamically adapt in order to possess good stability and response time performance over time.

Incidentally, it is known from prior art by the patent application US2004/0123600 a regulation system teaching to optimize the definition of the real system over time in order to integrate defects and malfunctions appearing over time. The optimization of such a real system is complex (definition of new transfer functions, etc.) and does not allow a responsive regulation. The computational cost is very high.

An adaptive correction model is also known from U.S. Pat. No. 5,537,310, in which the parameterization gain of a real system model is adapted during a transient phase. This document only deals with stability for transients and does not address quickness defects.

SUMMARY

The invention relates to a system for regulating a physical parameter of a real system of a turbomachine from a physical parameter set point, the regulation system having a response time and comprising:
- a corrector comprising a correction function and a parameterization gain K,
- a theoretical inverse transfer function of the real system, and
- a system for optimizing the parameterization gain K during regulation, the optimization system comprising:
  - a stability correction module configured to determine a first gain constant K1, with a positive value, upon detecting an instability of the regulation system upon regulating the physical parameter,
  - a module for correcting the response time of the regulation system, configured to determine a second gain constant K2, with a negative value, upon detecting a delay upon regulating the physical parameter, the stability correction module being configured to inhibit the response time correction module upon detecting an instability upon regulating the physical parameter, and
  - a determination module configured to determine the parameterization gain K as a function of the first gain component K1 and second gain component K2 previously determined.

The invention is remarkable in that the regulation system makes it possible to dynamically correct a stability defect by increasing the parameterization gain and a delay by decreasing the parameterization gain, so that the regulation system has optimal performance. The regulation system is thus self-adaptive. It is advantageously no longer necessary to sacrifice response time for stability as in prior art. The regulation is thus more responsive. Advantageously, the improvement of the quickness is inhibited in case of instability. In other words, the stability is corrected as a priority, the response time being improved only when the regulation system is stable. By virtue of the regulation system according to the invention, the regulation is particularly effective in counteracting periodic phenomena, characteristic of a turbomachine with rotating elements, which affect the regulation of a physical parameter over time.

The regulation system can thus correct itself according to its own response.

Preferably, a deviation is defined between the physical parameter and the physical parameter set point. The stability correction module comprises a stability detection module configured to compare the deviation to a high deviation threshold and a low deviation threshold. The stability detection module is configured to detect instability if the deviation is successively greater than the high deviation threshold and then lower than the low deviation threshold. In other words, the stability detection module enables a deviation from a predetermined range to be measured. Such detection is quick and robust.

Preferably, since the deviation oscillates during an instability, the stability detection module is configured to count oscillations following a detection of an instability and to determine a stability correction parameter TopCS as a function of the number of oscillations counted NB-osc, the first gain component K1 depending on the stability correction parameter TopCS. Thus, by counting the number of oscillations, the degree of instability is determined and the appropriate degree of correction can be derived therefrom.

Preferably, the stability correction module is configured to set the number of oscillations counted NB-osc to zero in case of detection of a transient phase generated by a significant variation in the physical parameter set point.

In other words, the stability detection module is dedicated to ensure stability during a stationary phase, the stability during a transient phase being ensured by dedicated means. This improves the correction by allowing the calculation of optimal correction values according to the type of instability.

Preferably, the stability detection module is configured to set the number of oscillations counted to zero following the determination of the parameterization gain K from the first gain component K1. In other words, a new correction is inhibited as long as a previous correction has not yet produced its effects.

According to one aspect of the invention, the stability correction module comprises an overshoot detection module configured to determine an overshoot parameter TopOS, the first gain component K1 depending on the overshoot parameter TopOS. According to the invention, the stability during a transient phase, here an acceleration transient phase, which corresponds to an increase in the physical parameter set point, is monitored by dedicated means, which ensures an optimum correction.

Preferably, a deviation being defined between the physical parameter and the physical parameter set point, the overshoot detection module is configured to start a deviation monitoring period following a significant increasing variation in the parameter set point. The overshoot detection module is configured to compare the deviation to at least one overshoot threshold, and the overshoot detection module is configured to detect an overshoot if the deviation is greater than the overshoot threshold during the monitoring period. In other words, only overshoots or undershoots during a previously verified transient phase are taken into account. Overshoots or undershoots during a stationary phase are advantageously ignored in the overshoot detection module. Separate processing of an overshoot advantageously enables a responsive correction to be made so that any future overshoot or undershoot is suppressed as soon as the first overshoot or undershoot occurs. Since the monitoring window is narrow, the correction made can be more relevant and responsive.

Preferably, the overshoot detection module is configured to inhibit an overshoot detection in case of detection of a decreasing variation in the parameter set point. In other words, the monitoring period is stopped if the increasing transient conditions are no longer met. Any erroneous correction is thus avoided.

According to one aspect of the invention, the stability correction module comprises an undershoot detection module configured to determine an undershoot parameter TopUS, the first gain component K1 depending on the undershoot parameter TopUS. Advantageously, the acceleration and deceleration transients are distinctly processed in order to achieve a tailor-made regulation for each type of instability.

Preferably, the stability correction module comprises a transient detection module configured to measure a variation in the deviation ε from the closed loop response yBF of the physical parameter. In other words, in order to detect a transient, the theoretical closed-loop response is calculated beforehand to form a comparison standard. Such a dynamic comparison standard is advantageous for determining the monitoring period and performing a responsive correction.

Preferably, the response time correction module is configured to determine a tolerance range around the physical parameter set point and to determine a second gain constant K2 if the physical parameter is not within the tolerance range. Thus, if an excessive delay or advance is detected, a correction is made dynamically.

The invention is also directed to a method for regulating a physical parameter by implementing a regulation system REG as previously set forth, the regulation method comprising:
- a step of monitoring the stability upon regulating the physical parameter,
- a step of determining a first gain constant K1, with a positive value, upon detecting an instability upon regulating the physical parameter,
- a step of monitoring the response time of the regulation system REG upon regulating the physical parameter in the absence of instability,
- a step of determining a second gain constant K2, with a negative value, upon detecting a delay upon regulating the physical parameter,
- a step of determining the parameterization gain K of the corrector C(p) from the first gain constant K1 and the second gain constant K2 so as to ensure stability of the regulation while optimizing the response time.

The invention also relates to a computer program comprising instructions for executing the steps of the control method as set forth above, said program being executed by a computer.

The invention further relates to an electronic control unit for a turbomachine comprising a memory comprising instructions of a computer program as set forth beforehand.

The invention also relates to a turbomachine comprising an electronic unit as set forth previously.

BRIEF DESCRIPTION OF THE DRAWINGS

The invention will be better understood upon reading the following description, given solely by way of example, and referring to the appended drawings given as non-limiting examples, in which identical references are given to similar objects and in which.

It should be noted that the figures set out the invention in a detailed manner for implementing the invention, said figures can of course be used to better define the invention if necessary.

DETAILED DESCRIPTION

Figure 1:
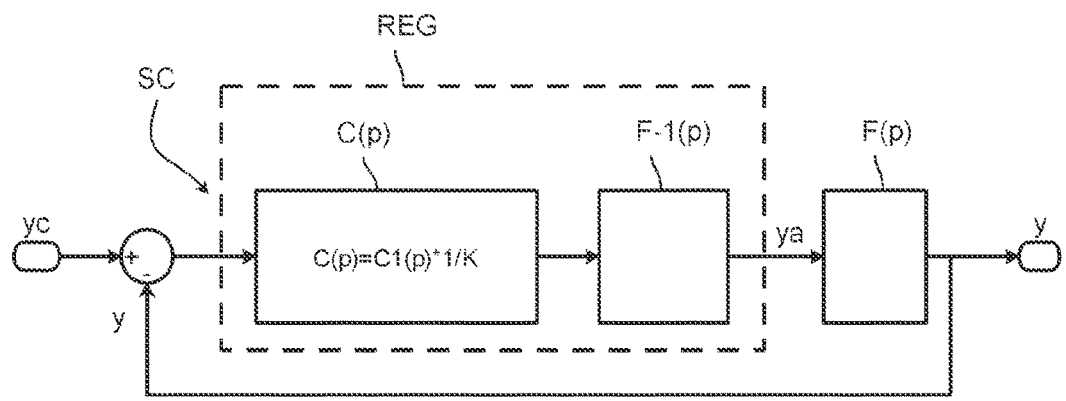
FIG. 1 is a schematic representation of a system for correcting a real system by an inverse model according to prior art.

With reference to FIG. 1, there is represented a correction system SC configured to determine a control parameter y as a function of a parameter set point yc. In this example, the correction system SC implements an inverse model corrector. In other words, the correction system SC successively comprises a corrector C(p), an inverse model F-1(p) and a real system F(p). The real system F(p) corresponds to the real system of the turbomachine which acts on the control parameter y. In practice, the real system F(p) implements several transfer functions. By nature, the real system F(p) changes over time (drift, wear, etc.) and does not respond identically to a parameter set point yc.

In a correction system SC implementing an inverse model corrector, it is assumed that the real system F(p) is mathematically invertible so as to define the inverse model $F^{-1}(p)$. According to this hypothesis, the correction system SC then depends essentially on the corrector C(p) since $F^{-1}(p)$ *F(p)=1. In other words, the response time and stability of the correction system can then be directly determined by the corrector C(p).

In a known manner, the corrector C(p) comprises a transfer function Ci(p) and a tuning gain K known to those skilled in the art so as to obtain the following formula: C(p)=(p)*1/K.

According to the present invention, the tuning gain K is modified over time so as to adjust the response time and the stability of the corrector C(p). Thus, if a pure delay occurs in the real system F(p) or if the statistical gain of the real system F(p) is changed, the tuning gain K can be modified to maintain optimal performance.

Figure 2:
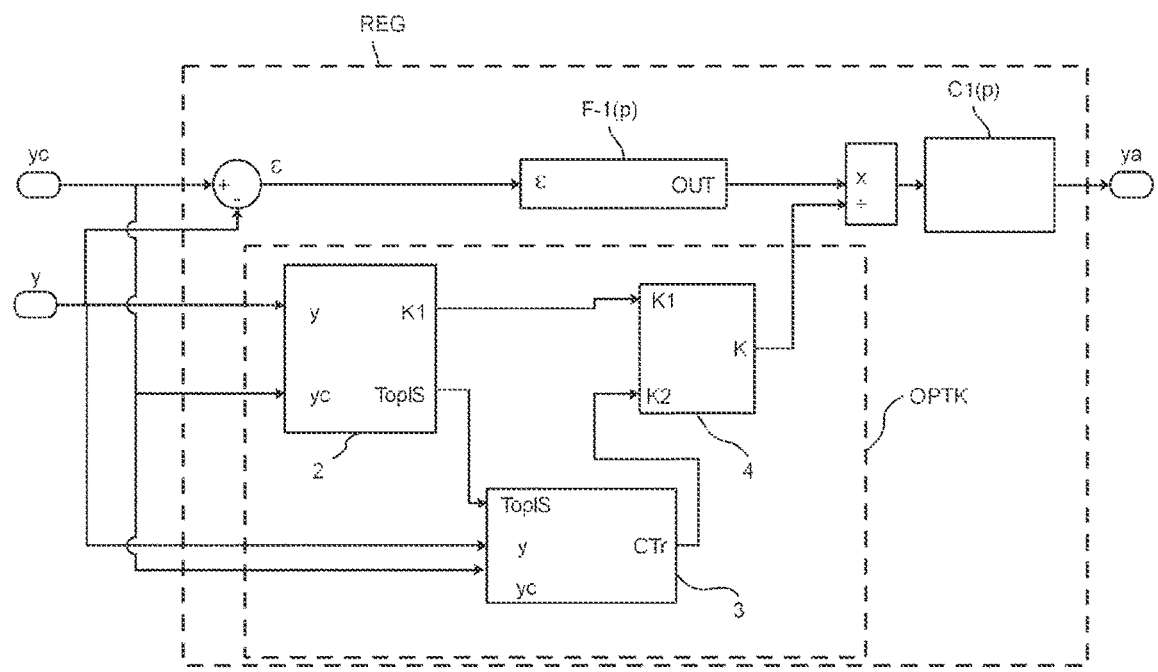
FIG. 2 is a schematic representation of a regulation system according to one embodiment of the invention for a correction system of a real system by an inverse model.

Hereafter, the set comprising the corrector C(p) and the inverse model $F^{-1}(p)$ is referred to as regulator REG and provides a preliminary physical parameter ya to the real system F(p). With reference to FIG. 2, a regulator REG according to one embodiment of the invention is represented. The regulator REG has a response time.

With reference to FIG. 2, the corrector C(p) comprises a transfer function $C_1$ (p) and an optimization system OPTK of the parameterization gain K.

The optimization system OPTK comprises a stability correction module 2 configured to determine a first gain component K1, a response time correction module 3 configured to determine a second gain component K2, and a determination module 4 configured to determine the parameterization gain K as a function of the previously determined gain components K1, K2. In the following, a deviation ε is defined which corresponds to the difference between the physical parameter set point yc and the physical parameter y (ε=yc−y).

The different modules will now be set forth in detail.

With reference to FIG. 2, the stability correction module 2 is configured to determine the first gain component K1 as well as an instability TopIS as a function of the control parameter y and the parameter set point yc.

Figure 3:
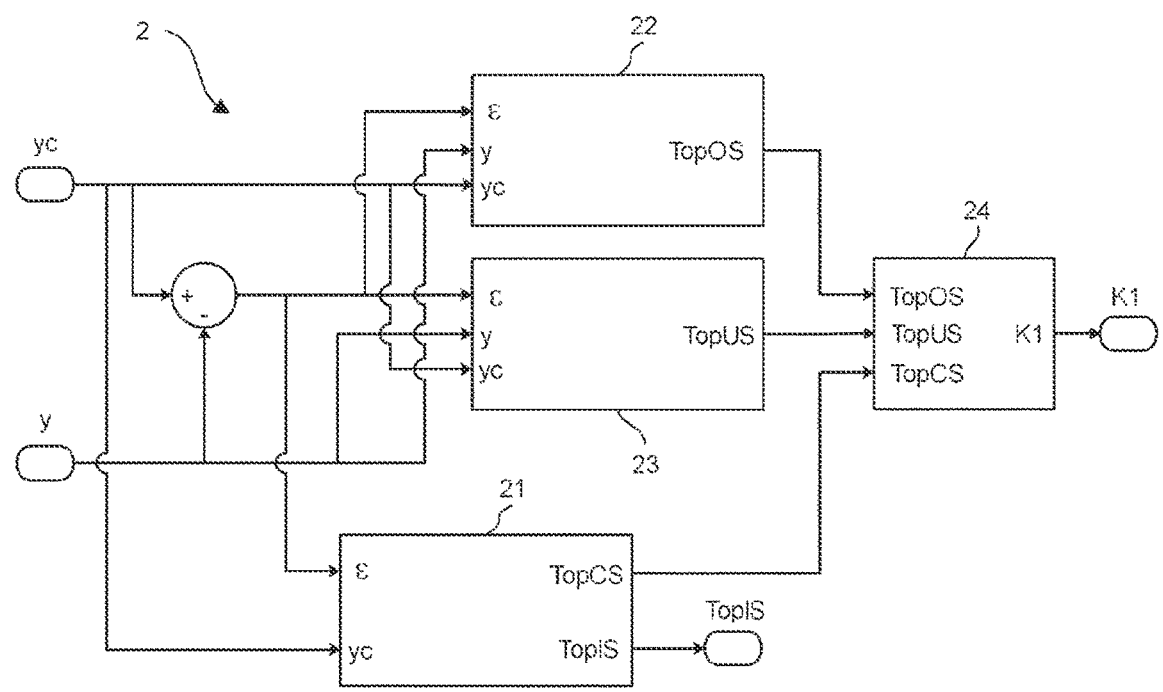
FIG. 3 is a schematic representation of one embodiment of a stability correction module.

Stability Correction Module 2 (FIG. 3)

The stability correction module 2 is schematically represented in FIG. 3. It comprises an instability detection module 21 configured to detect an instability TopIS and determine a stability correction parameter TopCS from the deviation ε and the parameter set point yc. In practice, as will be set forth later, the instability detection module 21 allows detection of an instability around the parameter set point yc.

The stability correction module 2 further comprises an overshoot detection module 22, configured to detect an overshoot TopOS from epsilon ε, the control parameter y and the parameter set point yc. In other words, during a quick increasing variation in the parameter set point yc, the physical parameter y can overshoot or undershoot the parameter set point yc and create an instability related to the transient phase. In what follows, the shorthand "a transient" will also be used to refer to a transient phase.

Similarly, the stability correction module 2 further comprises an undershoot detection module 23, configured to detect an undershoot TopUS from epsilon ε, the control parameter y and the parameter set point yc.

The stability correction module 2 finally comprises a stability correction module 24 configured to determine the first gain component K1 as a function of the overshoot detection parameter TopOS, the undershoot detection parameter TopUS and the stability correction parameter TopCS obtained by the other modules 21, 22, 23 of the stability correction module 2.

Stability Detection Module 21

Figure 4:
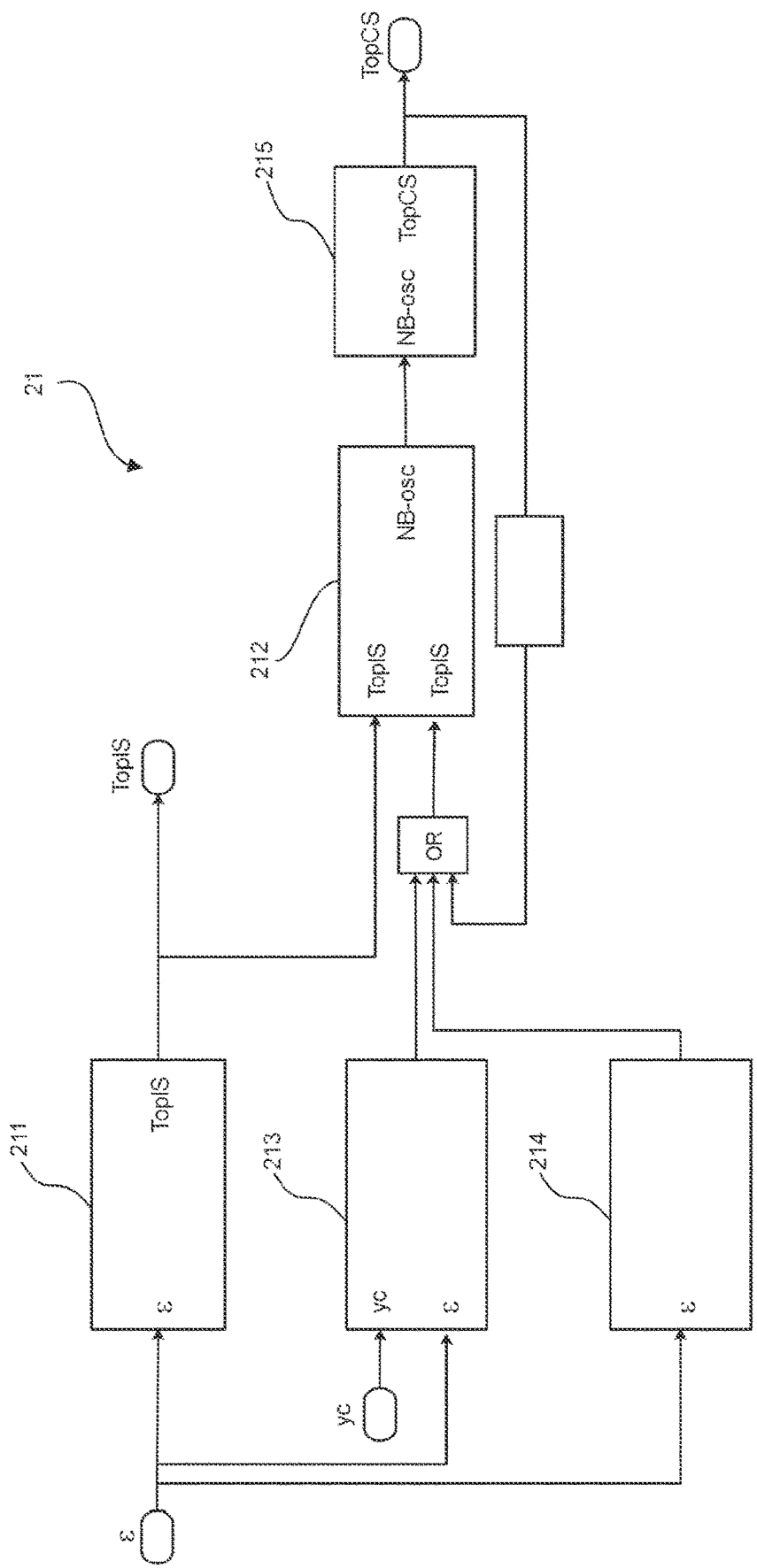
FIG. 4 is a schematic representation of one embodiment of an instability detection module.

The stability detection module 21 is schematically represented in FIG. 4. The stability detection module 21 comprises a first module 211 to detect an instability TopIS if the epsilon ε value is greater than a high threshold SH-CS or lower than a low threshold SB-CS. An instability TopIS is detected when a high threshold SH-CS and a low threshold SB-CS are successively overshot or undershot.

Figure 5:
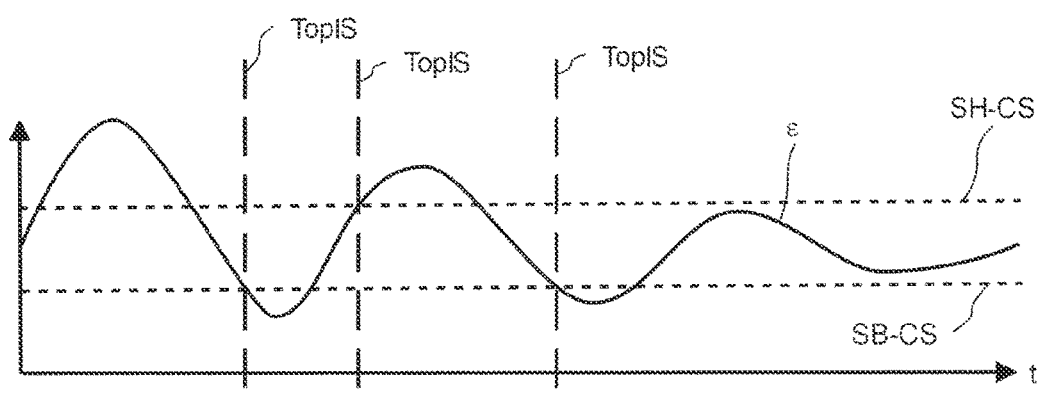
FIG. 5 is a time course curve of the deviation ε for the detection of instabilities.

As an example, the first module 211 is configured to compare, on the one hand, the deviation ε to the high threshold SH-CS and, on the other hand, the deviation ε to the low threshold SB-CS. If the deviation ε is greater than the high threshold SH-CS, the over- or under-shoot is stored in a memory. Similarly, if the deviation ε is lower than the high threshold SB-CS, the over- or under-shoot is stored in a memory. When two over- or under-shoots of different natures are successively detected, an instability TopIS is detected as illustrated in FIG. 5. In the absence of threshold SB-CS, SH-CS crossing, no instability TopIS is detected.

As illustrated in FIG. 4, the stability detection module 21 further comprises a second module 212 to count oscillations NB-osc of the physical parameter y when an instability TopIS is detected. The number of oscillations NB-osc can be conveniently obtained by counting successive over- or under-shoots and storing them in a memory during a stationary phase.

The second module 212 is also configured to receive a zero reset command to reset the number of oscillations NB-osc to zero. To this end, as illustrated in FIG. 4, the stability detection module 21 comprises a third module 213 and a fourth module 214 to determine a zero reset RAZ.

As illustrated in FIG. 4, the stability detection module 21 comprises a fifth module 215 configured to determine the correction parameter TopCS from a number of oscillations NB-osc. In this embodiment, if the number of oscillations NB-osc is greater than 3, a correction is performed and a correction parameter TopCS is transmitted by the stability detection module 21. As illustrated in FIG. 4, during a correction, a zero reset information RAZ is also transmitted to avoid repeating the same correction.

Still referring to FIG. 4, the stability detection module 21 comprises a third module 213 to detect a transient, that is, a significant variation in the parameter set point yc, and to reset the number of oscillations NB-osc to zero following a transient detection. To this end, the third module 213 monitors whether the deviation ε is maintained between a second high threshold SH2 and a second low threshold SB2. Preferably, the second high threshold SH2 is larger than the high threshold SH-CS and the second low threshold SB2 is smaller than the low threshold SB-CS which were used previously so as to maintain a margin with respect to the detection of instability TopIS. If the second thresholds SB2, SH2 are exceeded, the presence of a transient is detected, which resets the number of oscillations NB-osc to zero and stops the stability correction. Indeed, transient-related corrections are processed by the overshoot detection module 22 and the undershoot detection module 23.

As illustrated in FIG. 4, the stability detection module 21 comprises a fourth timing module 214 configured to detect whether a correction has been made and command a zero reset RAZ in case of detection. In other words, the fourth module 4 enables a new correction to be inhibited when a previous correction has not yet taken effect. In this example, the fourth module 214 is in the form of a timing which is a function of the response time of the real system F(p).

Advantageously, the stability detection module 21 enables a correction parameter TopCS to be determined as a function of the number of oscillations NB-osc measured following the detection of an instability TopIS i. Advantageously, any correction is inhibited in the case of a transient or a correction not yet taken by the real system F(p) into account. The correction parameter TopCS calculated in this way makes it possible to improve regulation stability, as will be set forth later.

Overshoot Detection Module 22

The overshoot detection module 22 is schematically represented in FIG. 3. It allows an upper correction value TopOS to be determined if the physical parameter y to be regulated makes an overshoot at the end of the transient. In other words, the overshoot detection module 22 enables an immediate correction to be made following an increasing variation in the parameter set point yc.

Figure 6:
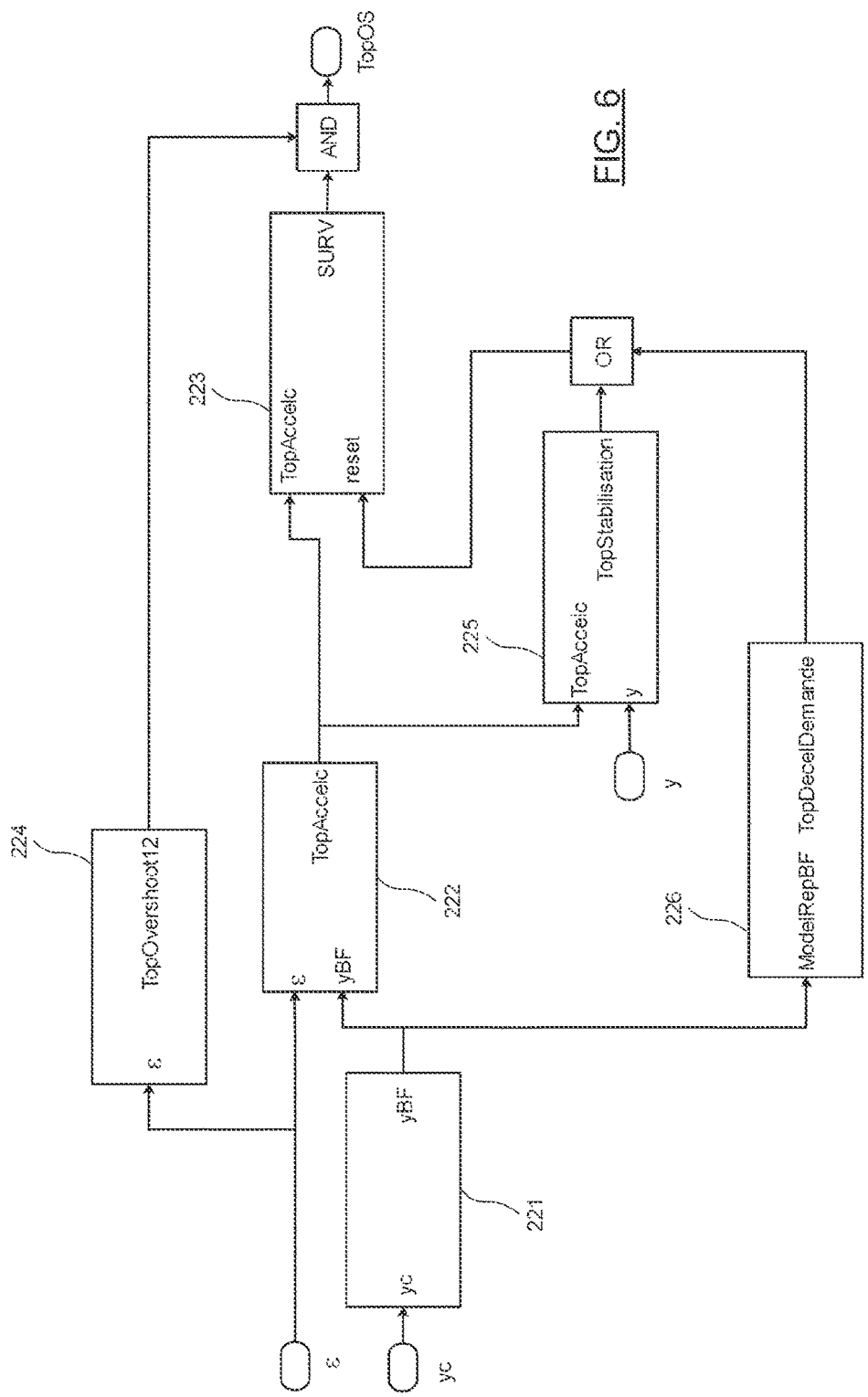
FIG. 6 is a schematic representation of one embodiment of an overshoot detection module.

In practice, with reference to FIG. 6, the overshoot detection module 22 comprises a module for determining 221 the response of the real system F(p) in a closed loop Yb following the reception of a physical parameter set point yc. This allows a theoretical ideal response of the real system F(p) to be determined. In this example, the determination module 221 implements a "low-pass" type, in particular, first- or second-order filter.

Figure 7:
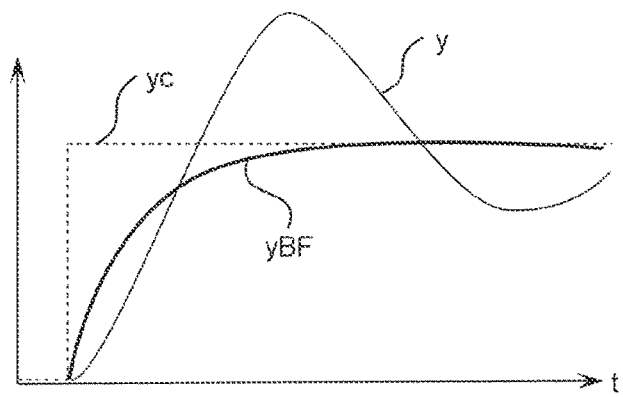
FIG. 7 is a time course curve of the physical parameter following an increasing variation in the parameter set point, that is an increasing transient phase.

The overshoot detection module 22 further comprises a transient detection module 222, that is, a variation in the deviation ε from the closed loop response yBF, in particular, of its derivative. In this way, it is determined whether the regulation is actually in an increasing transient phase, that is, an increasing variation in the control set point yc. If the deviation ε deviates from the closed loop response yBF, an acceleration is detected TopAccel. An example of a transient with an instability at the output of the transient is schematically illustrated in FIG. 7 (damping defect).

Still referring to FIG. 6, the overshoot detection module 22 further comprises a storage module 223 configured to start a monitoring period when an acceleration TopAccel is detected. Thus, the overshoot detection module 22 focuses on detecting an instability during a transient acceleration phase. Indeed, the overshoot detection module 22 does not aim at detecting an over- or under-shoot of the physical parameter y when the parameter set point yc is stationary, which corresponds to a regulation instability.

The overshoot detection module 22 further comprises a module for monitoring the deviation ε with respect to overshoot thresholds SD1, SD2. In this embodiment, the monitoring module 222 comprises two overshoot thresholds SD1, SD2, which in this example are hysteresis type thresholds.

As illustrated in FIG. 6, if an overshoot of an overshoot threshold SD1, SD2 is detected during the monitoring period, an overshoot correction value TopOS is output by the overshoot detection module 22.

Advantageously, the overshoot detection module 22 comprises modules to stop the monitoring period of the storage module 224 in case of detection of stabilization (module 225) or in case of deceleration set point (module 226). Indeed, it is necessary to avoid that an overshoot is detected by a deceleration of the physical parameter set point yc. This avoids making untimely corrections which are a source of instability.

Figure 8:
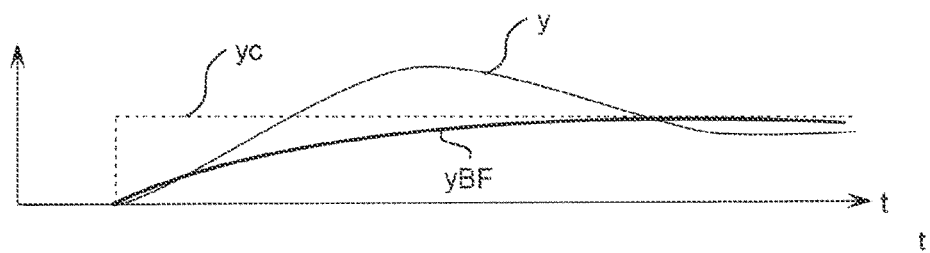
FIG. 8 is a set of curves representing the time course, during a transient phase, of the physical parameter and of the deviation to determine an overshoot correction value.
Figure 8:
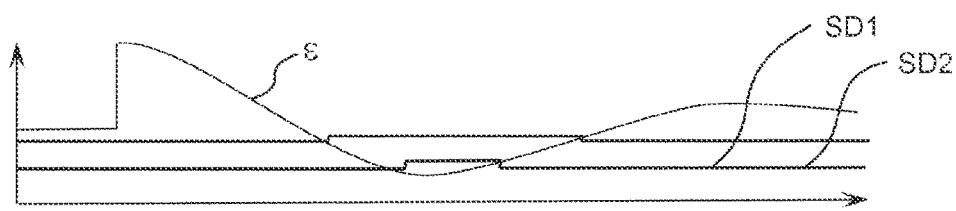
Figure 8:
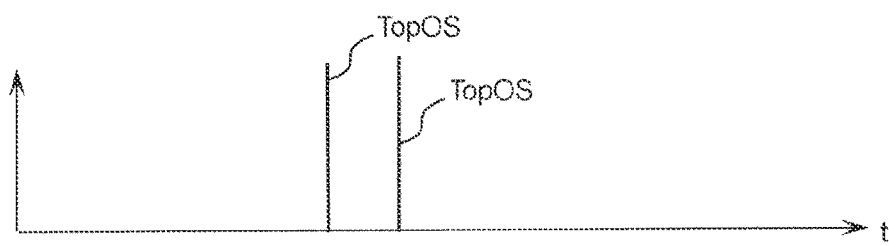

An example of implementation of an overshoot detection is illustrated in FIG. 8. In this example, following a transient acceleration phase, the deviation ε overshoots the first overshoot threshold SD1, which activates an overshoot correction TopOS, and then the second overshoot threshold SD2, which again activates an overshoot correction TopOS. In other words, the correction is responsive and allows the regulation to be corrected as soon as an overshoot occurs at the end of the transient. Such a correction is possible because it is only carried out in the presence of a transient.

Undershoot Detection Module 23

The undershoot detection module 23 is schematically represented in FIG. 3. It will not be set forth in detail hereafter given that it is similar to the overshoot detection module 22 but aims at detecting an undershoot during a decreasing variation in a parameter set point yc, that is a deceleration of the physical parameter set point yc.

Similarly to the overshoot detection module 22, if a transient phase is detected and an exceedance of a lower threshold is detected, an undershoot correction value TopUS is output from the undershoot detection module 23.

Calculation Module 24

The calculation module 24 is schematically represented in FIG. 3 and has the function of determining the first correction component K1 from the correction values TopCS, TopOS and TopUS.

Figure 9:
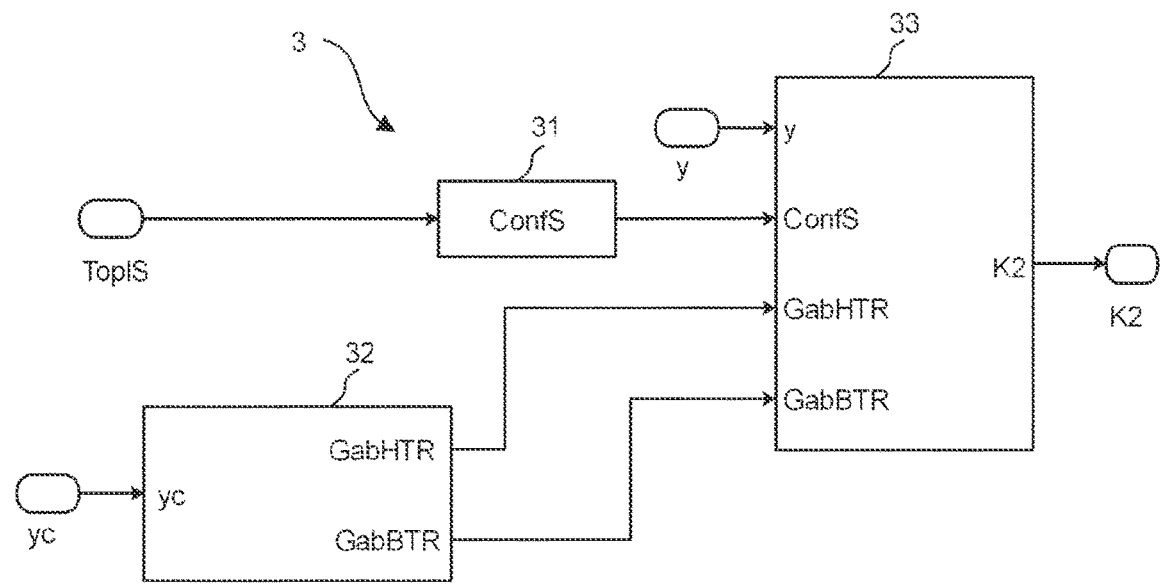
FIG. 9 is a schematic representation of one embodiment of a response time correction module.

Response Time Correction Module 3 (FIG. 9)

The response time correction module 3 is schematically represented in FIG. 9. It comprises a stability detection module 31 configured to detect that the parameter set point yc is actually stable. In practice, the stability detection module 31 checks that the parameter set point yc does not vary much, that is, without transients. The stability detection module 31 produces a stability confirmation signal ConfS for a calculation module 33.

Still referring to FIG. 9, the response time correction module 3 comprises a module for determining a tolerance range 32 around the physical parameter set point yc. In this example, a low template GabBTR and a high template GabHTR are determined beforehand and a tolerance range defined between yc−GabBTR and yc+GabHTR is derived therefrom. The tolerance range corresponds to the lag that is considered allowable between the physical parameter y and the physical parameter set point yc. Preferably, the templates GabBTR, GabHTR are determined from the response of the real system F(p) in a closed loop yBF following the reception of a physical parameter set point yc. Thus, the templates GabBTR, GabHTR are ideally determined to define a reference tolerance range.

The response time correction module 3 further comprises a calculation module 33 configured to determine a second gain constant K2 if the physical parameter y does not belong to the tolerance range during a stationary phase confirmed by the confirmation signal ConfS.

In practice, the response time correction module 3 can monitor any delay of the physical parameter y with respect to the physical parameter set point yc. Such a delay can, for example, be related to a parameterization gain K that has been increased too much, in particular, following a detection of an instability. A second gain constant K2 with a negative value makes it possible to improve the response time. Advantageously, several point corrections are thus performed.

Figure 10:
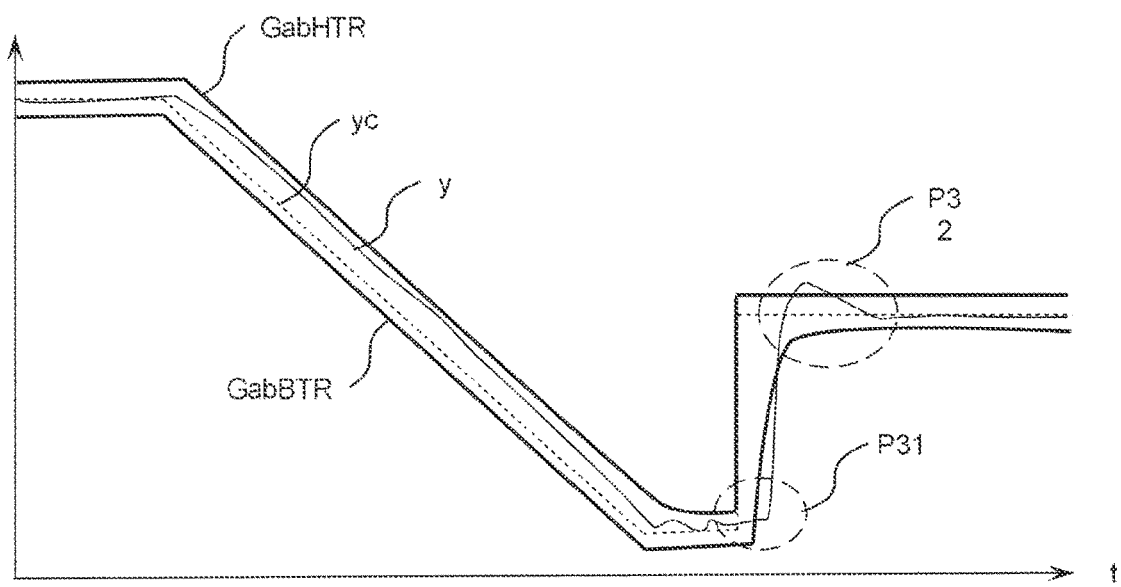
FIG. 10 is a time course curve of the physical parameter y with respect to the physical parameter set point yc in stationary phase.

As illustrated in FIG. 10, the physical parameter y deviates from the monitoring range in the zones P31 and P32, which reflects a delay in regulation. The response time correction module 3 determines the second gain constant K2 based on the number of deviations outside the monitoring range.

Module 4 for Determining the Parameterization Gain K (FIG. 2)

As illustrated in FIG. 2, the module 4 for determining the parameterization gain K is configured to sum the first gain constant K1, determined by the stability correction module 2, and the second gain constant K2, determined by the response time correction module 3. Preferably, a static gain constant is also added to determine the parameterization gain K. In fact, the parameterization gain K is modified in real time.

Given that the first gain constant K1 is positive and the second gain constant K2 is negative, the parameterization gain K is dynamically modified during the regulation in order to adapt to the changes over time and correct any drift.

Example of implementation of the regulation method with dynamic optimization of the tuning gain K According to the regulation method according to the invention, the method comprises a step of monitoring the stability upon regulating the physical parameter, a step of determining a first gain constant K1, with a positive value, upon detecting an instability upon regulating the physical parameter y, a step of monitoring the response time upon regulating the physical parameter in the absence of instability, a step of determining a second gain constant K2, with a negative value, upon detecting a delay upon regulating the physical parameter, and a step of determining the parameterization gain K of the corrector C(p) from the first gain constant K1 and the second gain constant K2 so as to ensure stability of the regulation while optimizing the response time.

Figure 11:
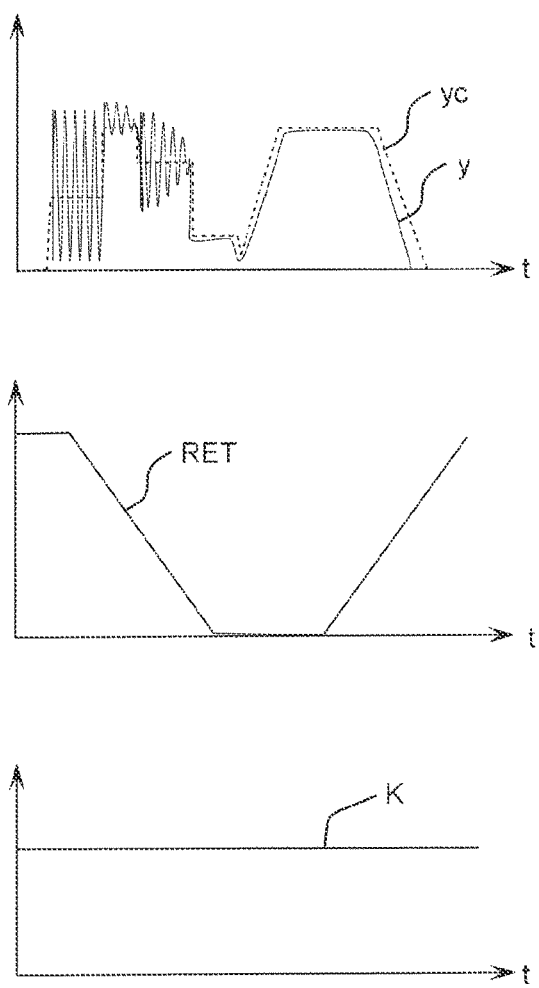
FIG. 11 is a set of curves representing the time course of the physical parameter following a periodic delay affecting the real system for a regulation system according to prior art.

As an example, in order to set forth the advantages of the invention with respect to prior art, the time course of the physical parameter y as a function of the physical parameter set point yc (upper curves) when the real system F(p) undergoes a periodic delay RET (middle curve) for a static parameterization gain (lower curve) is represented in FIG. 11. In this example, the delay RET varies between 0.2 s and 3 s.

As illustrated in FIG. 11, when the delay RET becomes significant, significant instabilities of the physical parameter y appear, both in stabilized operation and during transients. Moreover, the quickness is not optimal. Such a regulation is not satisfactory.

Figure 12:
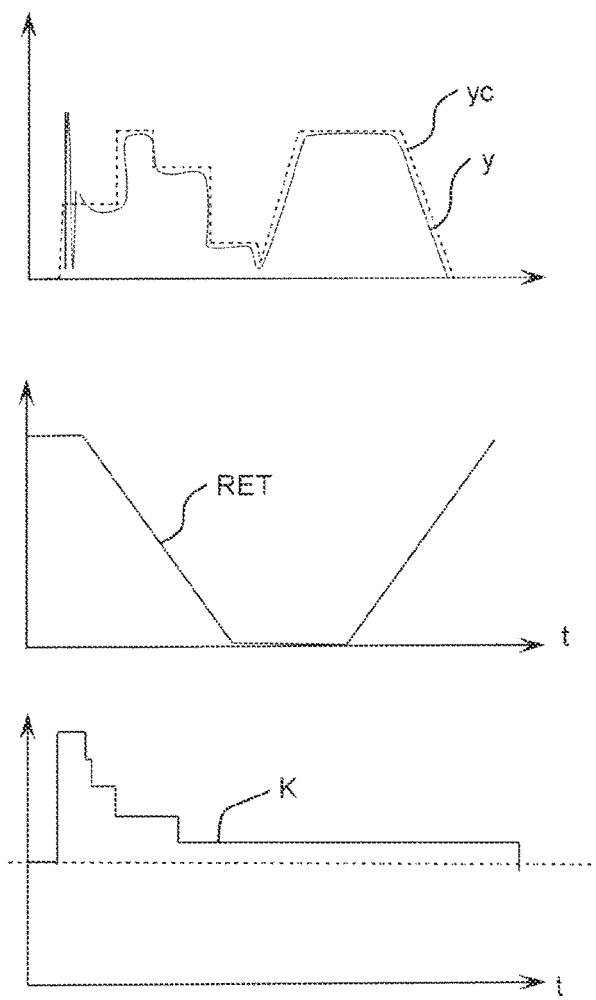
FIG. 12 is a set of curves representing the time course of the physical parameter following a periodic delay affecting the real system for a regulation system according to the invention.

With reference to FIG. 12, the time course of the physical parameter y as a function of the physical parameter set point yc (upper curves) when the real system F(p) undergoes a periodic delay RET (middle curve) for a dynamic parameterization gain (lower curve) as optimized by the regulation system REG according to the invention is represented.

As illustrated in FIG. 12, when the delay RET becomes significant, an instability of the physical parameter y appears which is responsively corrected by an increase in the parameterization gain K. This increase is related to the stability correction module 2 which has increased the first gain constant K1 following the detection of the instability TopIS. When the delay RET becomes smaller, the past increase of the parameterization gain K is detrimental to the response time and introduces a lag. This lag is responsively corrected by a decrease of the parameterization gain K. This decrease is related to the response time correction module 3 which has decreased the second gain constant K2 following the detection of a lag.

By virtue of the invention, the stability and response time of the regulation system REG are dynamically and responsively corrected over time. The performance of the regulation system REG is optimal due to its self-adaptation.

The invention claimed is:

1. A regulation system for regulating a physical parameter of a real system F(p) of a turbomachine from a physical parameter set point, a response time is regulated when the physical parameter is changed with the regulation system comprising:
    a regulator comprising:
        a corrector comprising a correction function C1(p) and a parameterization gain K,
        a theoretical inverse transfer function F-1(p) of the real system F(p), and
        an optimization system for optimizing the parameterization gain K during regulation, the optimization system comprising:
            i. a stability correction module configured to determine a first gain constant K1, with a positive value, upon detecting an instability of the regulation system upon regulating the physical parameter,
            ii. a response time correction module for correcting the response time of the regulation system, configured to determine a second gain constant K2, with a negative value, upon detecting a delay upon regulating the physical parameter, the stability correction module being configured to inhibit the response time correction module upon detecting an instability upon regulating the physical parameter,
            iii. a determination module configured to determine the parameterization gain K as a function of the first gain component K1 and second gain component K2 previously determined, which parametrization gain K is configured to be used to regulate the physical parameter; and
        wherein the physical parameter being regulated for which the regulation system measures the response time to provide stability comprises one of a turbojet valve, a fuel flow rate, and an orientation angle of a vane.

2. The regulation system according to claim 1, wherein, with a deviation being defined between the physical parameter and the physical parameter set point, the stability correction module comprising a stability detection module configured to compare the deviation with a high deviation threshold and a low deviation threshold, the stability detection module is configured to detect an instability if the deviation is successively higher than the high deviation threshold and then lower than the low deviation threshold.

3. The regulation system according to claim 2, wherein, with the deviation oscillating during an instability, the stability detection module is configured to count oscillations following detection of an instability and to determine a stability correction parameter as a function of the number of oscillations counted, the first gain component K1 depending on the stability correction parameter.

4. The regulation system according to claim 3, wherein, the stability correction module is configured to reset the number of oscillations counted to zero in case of detection of a transient phase generated by a significant variation in the physical parameter set point.

5. The regulation system according to claim 1, wherein the stability correction module comprises an overshoot detection module configured to determine an overshoot parameter, the first gain component K1 depending on the overshoot parameter.

6. The regulation system according to claim 5, wherein, with a deviation being defined between the physical parameter and the physical parameter set point, the overshoot detection module is configured to start a monitoring period of the deviation following a significant increasing variation in the parameter set point, the overshoot detection module being configured to compare the deviation to at least one overshoot threshold during the monitoring period, the overshoot detection module being configured to detect an overshoot if the deviation is greater than the overshoot threshold.

7. The regulation system according to claim 1, wherein the response time correction module is configured to determine a tolerance range around the physical parameter set point and to determine a second gain constant K2 if the physical parameter does not fall within the tolerance range.

8. A method for regulating a physical parameter by implementing the regulation system according to claim 1, the regulation method comprising:
- a step of monitoring the stability upon regulating the physical parameter,
- a step of determining a first gain constant K1, with a positive value, upon detecting an instability upon regulating the physical parameter,
- a step of monitoring the response time of the regulation system REG upon regulating the physical parameter in the absence of instability,
- a step of determining a second gain constant K2, with a negative value, upon detecting a delay upon regulating the physical parameter,
- a step of determining the parameterization gain K of the corrector C (p) from the first gain constant K1 and the second gain constant K2 so as to ensure stability of the regulation while optimizing the response time.

9. A computer product comprising a non-transitory computer-readable medium having computer executable instructions embodied therein for executing the steps of the regulation method according to claim 8.

10. An electronic control unit for a turbomachine comprising a memory comprising instructions of the computer product according to claim 9.

11. A turbomachine comprising the electronic unit according to claim 10.

* * * * *